(12) United States Patent
Chen et al.

(10) Patent No.: US 6,377,934 B1
(45) Date of Patent: Apr. 23, 2002

(54) METHOD FOR PROVIDING A REVERSE STAR SCHEMA DATA MODEL

(75) Inventors: Li-Wen Chen, Cupertino; Juan J. Ortiz, Hayward, both of CA (US)

(73) Assignee: MetaEdge Corporation, Sunnyvale, CA (US)

( * ) Notice: Subject to any disclaimer, the term of this patent is extended or adjusted under 35 U.S.C. 154(b) by 0 days.

(21) Appl. No.: 09/306,677

(22) Filed: May 6, 1999

Related U.S. Application Data

(60) Provisional application No. 60/116,086, filed on Jan. 15, 1999.

(51) Int. Cl.[7] .............................................. G06F 16/102
(52) U.S. Cl. ........................ 705/10; 707/102; 707/104.1
(58) Field of Search .............................. 705/10; 707/10, 707/3, 5, 201, 102, 101; 717/1

(56) References Cited

U.S. PATENT DOCUMENTS

| | | |
|---|---|---|
| 4,972,504 A | 11/1990 | Daniel, Jr. et al. |
| 5,036,314 A | 7/1991 | Barillari et al. |
| 5,168,445 A | 12/1992 | Kawashima et al. |
| 5,191,522 A | 3/1993 | Bosco et al. ................ 364/401 |
| 5,299,115 A | 3/1994 | Fields et al. |
| 5,615,109 A | 3/1997 | Eder |
| 5,644,723 A | 7/1997 | Deaton et al. |
| 5,715,450 A | 2/1998 | Ambrose et al. |
| 5,721,903 A | 2/1998 | Anand et al. ................ 395/605 |
| 5,758,355 A | 5/1998 | Buchanan |
| 5,787,437 A | 7/1998 | Potterveld et al. .......... 707/103 |
| 5,794,246 A | 8/1998 | Sankaran et al. |
| 5,854,746 A | 12/1998 | Yamamoto et al. |
| 5,873,096 A | 2/1999 | Lim et al. |
| 5,893,075 A | 4/1999 | Plainfield et al. |
| 6,151,601 A | * 11/2000 | Papierniak et al. ........... 707/10 |
| 6,167,405 A | * 12/2000 | Rosensteel, Jr. et al. .... 707/102 |
| 6,212,524 B1 | * 4/2001 | Weissman et al. ........... 707/101 |

FOREIGN PATENT DOCUMENTS

| | | | |
|---|---|---|---|
| WO | WO-200057311 A2 | * 2/2001 | ............ G06F/17/30 |

OTHER PUBLICATIONS

Gopalkrishnan et al. Star/Snow-flake Schema Driven Object-Relationship Data Warehouse Design and Query Processing Strategy. star schema conversion to object-relational warehouse.*

Brooks. Mark of the data marts. DBMS, Mar. 1997, v10, n3, pp. 55(4).*

Krippendorf et al. The translation of star schema into entity relationship diagrams. Database and Expert Systems Applications, Sep. 1997, pp. 390–395.*

Greene. Oracle8 Server Unleashed. Sams, 1998, chapter 30 "Data Warehouses".*

Brachman et al. Mining Business Databases. Communications of the ACM, Nov. 1996, pp. 42–48.*

FIRESTONE. Object–oriented Data Warehousing. Executive Information Systems, Inc. White Paper No. 5, Aug. 7, 1997, downloaded Jul. 25, 2001 http://dkms.com.*

* cited by examiner

*Primary Examiner*—Tario R. Hafiz
*Assistant Examiner*—Dave Robertson
(74) *Attorney, Agent, or Firm*—Squire, Sanders & Dempsey LLP

(57) ABSTRACT

According to the invention, techniques for organizing information from systems in a data warehousing environment are provided. In an exemplary embodiment, the invention provides a method for analyzing data from one or more data sources of an enterprise. The method provides a meta-model based technique for modeling the enterprise data. The enterprise is typically a business activity, but can also be other loci of human activity. Embodiments according to the invention can translate data from a variety of sources to particular database schema in order to provide organization to a data warehousing environment.

6 Claims, 16 Drawing Sheets

METHOD FOR PROVIDING A REVERSE STAR SCHEMA DATA MODEL

CROSS-REFERENCES TO RELATED APPLICATIONS

This application claims priority from the following U.S. Provisional Patent Application, the disclosure of which, including all appendices and all attached documents, is incorporated by reference in its entirety for all purposes:

U.S. Provisional patent application Ser. No. 60/116,086 Li-Wen Chen entitled, "METHOD AND APPARATUS FOR PERFORMING CUSTOMER DATA ANALYSIS OF A COMPUTER DATABASE USING REVERSE STAR SCHEMA DATA MODEL," filed Jan. 15, 1999.

The following commonly-owned co-pending applications, including this one, are being filed concurrently and the others are hereby incorporated by reference in their entirety for all purposes:

1. U.S. patent application Ser. No. 09/306,677, Li-Wen Chen and Juan Oritz entitled, "METHOD FOR PROVIDING A REVERSE STAR SCHEMA DATA MODEL"
2. U.S. patent application Ser. No. 09/306,650, Li-Wen Chen entitled, "APPARATUS FOR PROVIDING A REVERSE STAR SCHEMA DATA MODEL"
3. U.S. patent application Ser. No. 09/306,693, Li-Wen Chen entitled, "SYSTEM FOR PROVIDING A REVERSE STAR SCHEMA DATA MODEL"

BACKGROUND OF THE INVENTION

The present invention relates generally to computer database systems, and specifically to methods for organizing information from one or more systems in a data warehousing environment.

Few could foresee the rapid development of computer technology just a few years ago. Computers now have a place in our homes, our offices, our schools and even the our briefcases and satchels. As computer automation continues to impact an ever increasing portion of our daily lives, governments, businesses and individuals have turned to database technology to help them manage the "information explosion" and the exponential proliferation of information that must be sorted, assimilated and managed on a continuing basis. One area of importance to the database design field is data model selection for database applications.

A data model represents the structure or organization of data stored in the database. It enables the use of data in certain forms and may limit the data being used in other forms. Different applications usually require different data models. Many different data models can exist, and they usually differ markedly from one another. Typically, database applications are customized to a particular data model of a particular database. Different database vendors base their products on different data models, adding to the confusion. Usually, these applications must be re-implemented for different databases, even though the functioning of the application remains the same.

Presently, database developers have turned to data warehousing technology to resolve often conflicting data management requirements. Traditional data warehousing approaches focus on decision support applications, which emphasize summarized information. While perceived advantages exist, an inherent disadvantage to these systems is that transaction details about the customer's identity are lost. Traditional approaches exhibit shortcomings when applied to applications such as customer data analysis. Customer data analysis is a decision support analysis that correlates data to customers' activities, events, transactions, status and the like. Summarized information usually loses the detail level of information about customer identity, limiting the usefulness of traditional data warehousing approaches in these types of applications.

What is needed is a method for providing a database that can be customized to fit individual user needs, yet also able to support data analysis applications.

SUMMARY OF THE INVENTION

According to the invention, techniques for organizing information from a variety of sources, including legacy systems, in a data warehousing environment are provided. In an exemplary embodiment, the invention provides a method for analyzing data from one or more data sources of an enterprise. The method provides a meta-model based technique for modeling the enterprise data. The enterprise is typically a business activity, but can also be other loci of human activity. Embodiments according to the invention can translate data from a variety of sources to particular database schema in order to provide organization to a data warehousing environment.

The method includes a variety of steps, such as providing a model for an enterprise. The model can be a meta model that describes at a high level the information used by the enterprise. Meta models can describe relationships between groups of entities in a data model. Entities in a data model can comprise particular data types, and the like. The enterprise can be a business activity, and/or the like. A step of forming a data organization from the model is also part of the method. The data organization can include data schema and the like. Data schema define aspects of the database, such as attributes, domains and parameters, and the like, to a database management system (DBMS). The method also includes creating one or more databases for containing the data. Translating data from one or more sources to the data organization is also part of the method. A step of incorporating data into the database is part of the method. The method can also include a step of performing analysis on the data in the database. Accordingly, the combination of these steps can provide an environment for analyzing information about customers, business processes and the like.

In another aspect of the present invention, techniques for data warehousing are provided. In a particular embodiment, the invention provides a method for creating a database for organizing information from one or more sources. Embodiments can organize the data in the database according to a data schema, such as a reverse star schema. A reverse star schema model comprises an identity element (e.g., core components, and the like) and one or more entities that describe classifications of data (e.g. customer classification components, and the like), which can have one or more relationships with the identity element. In an exemplary embodiment, customer classification components provide different ways to categorize customers or different business views of the customers, for example. For example, customers can be categorized by geographic region, demographics and the like. The method comprises a variety of steps including selecting a data model template from pre-defined ones based upon one or more business requirements. The method also includes a step of selecting customer entities from pre-defined ones that fit the application based on their business processes and operations. The entities can be selected from a focal group, for example. In a particular embodiment, focal groups can describe information about customer characteristics, profiles, business related classifications, customers' roles, definitions and the like in a variety of business functional areas.

A step of defining entities for transactions and/or events and their attributes to form a customized group of customer activity components that are relevant to a particular application is also part of the method. The events can be arranged into customer activity components. These components can be organized into one or more customized groups that correspond to various operations and/or transactions. As event transactions can be scattered over time, these components comprise a set of business measures and attributes. These events can be independent as well as dependent from one another. A particular sequence of events can be used to describe different stages of customer activity. For example, in a particular time period, a customer may go through a sequence of events such as: subscription>billing>payment>promotion>price plan change>service call>cancellation. Each event can involve a plurality of different business processes or operations that reflect a lifecycle of a customer. The method also includes a step of defining one or more customer event types in the customer activity components. A step of selecting data tables and attributes that will comprise the source of a set of data tables having a particular data schema and attributes is also included in the method.

The method can also include steps of determining one or more attributes based on data types in source tables and primary and foreign keys. A step of creating one or more databases from the schema is also part of the method. The database can be a customer data warehouse, and the like. Creating data movement mapping rules can also be part of the method. Such mapping rules can provide information about translation of information in tables and attributes of data sources to the data warehouse.

In an embodiment according to the present invention, the method also includes providing users the capability to define their own application-specific entities in customer activity components. In some embodiments, users can choose from among a plurality of pre-defined attributes, as well as defining their own attributes. Many embodiments according to the present invention provide the capability to automatically derive data types. Embodiments can also provide options to translate data from one data type to another data type. Some embodiments also provide the capability to users to change the automatically derived data types if they so choose. Embodiments can also provide analysis functions of database contents, such as market basket analysis for customer buying behavior, customer valuation analysis, customer segmentation, and the like.

Numerous benefits are achieved by way of the present invention over conventional techniques. The present invention can provide techniques for providing data models that can be customized to fit different business needs, but are able to support reusable application code. Yet further, some embodiments using the techniques and data models according to the present invention can be used to solve customer data analysis problems. Many embodiments can provide the ability to users to customize their data models, while providing a set of generic and reusable customer data analysis functions. Many embodiments enable business applications to be built more easily and quickly than heretofore known methods. These and other benefits are described throughout the present specification. A further understanding of the nature and advantages of the invention herein may be realized by reference to the remaining portions of the specification and the attached drawings.

DESCRIPTION OF THE SPECIFIC EMBODIMENTS

The present invention provides techniques, including a method for organizing information from one or more databases, including legacy databases, in a data warehousing environment. Methods according to the invention can provide for more efficient use and storage of many types of information. In an exemplary embodiment, the invention provides a method for providing a customer centric data warehouse for business information. While the invention will be discussed generally in terms of such customer centric applications, those of ordinary skill in the art will realize that many other types of information can be organized and analyzed using the techniques according to the present invention. Thus, the following discussion is intended to be exemplary and not limiting.

Figure 1:
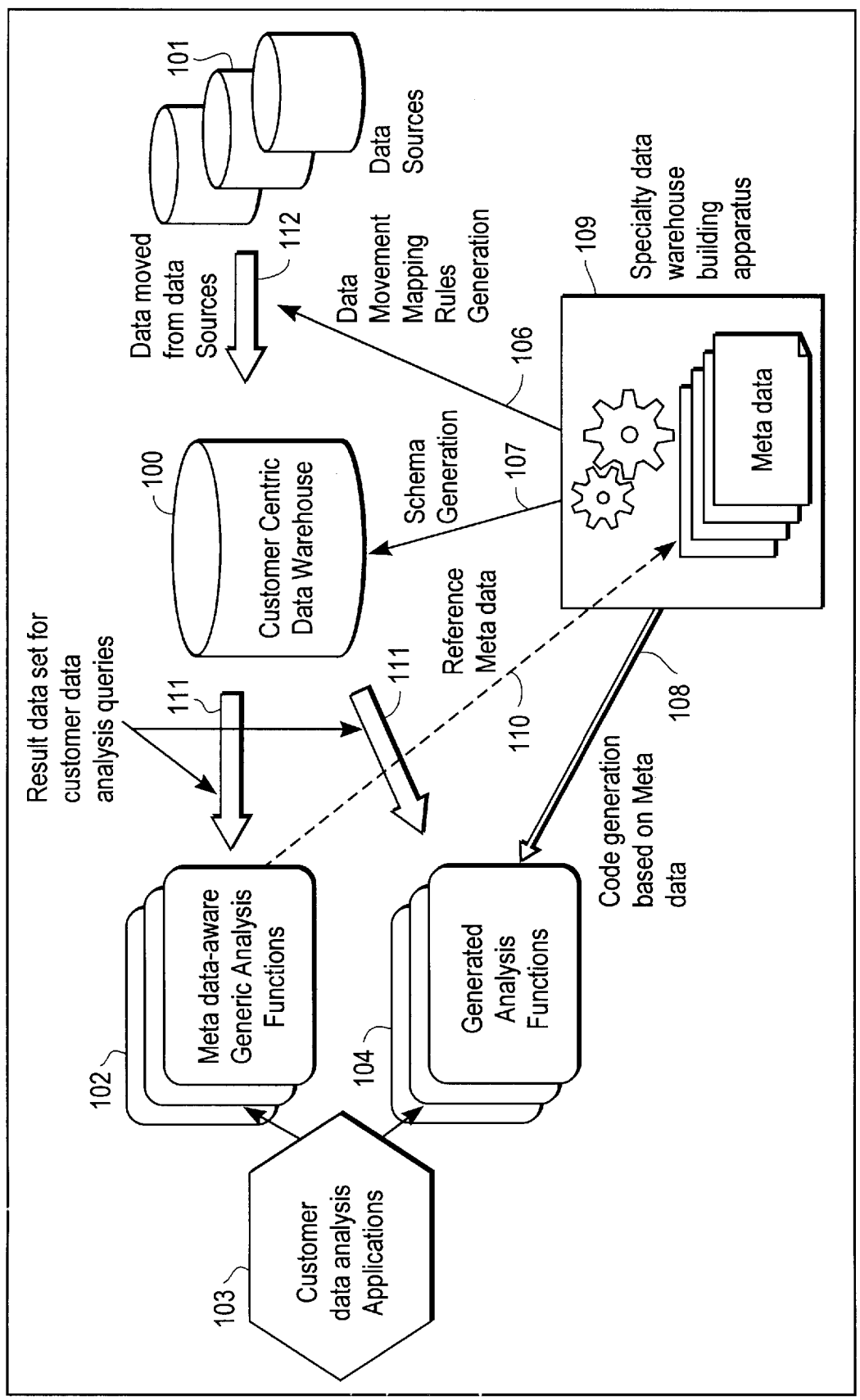
FIG. 1 illustrates representative architecture for data analysis according to the present invention.

FIG. 1 illustrates a simplified block diagram of representative customer data analysis architecture for data warehousing in a particular embodiment according to the present invention. This diagram is merely an illustration and should not limit the scope of the claims herein. One of ordinary skill in the art would recognize other variations, modifications, and alternatives. FIG. 1 illustrates a high level view of a plurality of components in a particular embodiment according to the present invention, including a data warehouse 100, that can comprise customer centric information, for example, a schema generation component, denoted by arrow 107, a plurality of analysis functions 102, 104, that reference data, as denoted by arrows 111 stored in data warehouse 100. A plurality of data sources 101, from which data can be moved into data warehouse 100, as indicated by arrow 112 are also illustrated in FIG. 1. Data warehouse 100 provides data accessibility to a plurality of functions and applications, such as meta data-aware customer data analysis functions 102 and generated customer data analysis functions 104. Customer data analysis application 103 can invoke functions and processes in both meta data-aware customer data analysis functions 102 and generated customer data analysis functions 104. Many of these components are defined by a data warehouse builder 109.

A presently preferable embodiment includes a data warehouse builder 109 central to the environment. Data warehouse builder 109 is operative to perform a wide variety of tasks including building and managing a data warehousing environment. These building and managing tasks can comprise tasks such as integrating meta data information gathered from business requirements and data source analysis, such as for example, a data schema 107, data processing and data movement rules 106, and the like. Data warehouse builder 109 can also perform the tasks of generating a data schema, such as data schema 107, for a customer-centric data warehouse, such as data warehouse 109, and providing a data repository for meta data, such as data repository 105.

Meta-data defined and organized by data warehouse builder 109 can include a data schema, such as a star schema, a reverse star schema, as well as many other data schema topologies, a plurality of source data processing, movement and loading rules, job schedules for loading or maintaining data flow within the data warehouse, user provided parameters for code generation of customer data analysis functions, and the like. Further, data warehouse builder can generate customer data analysis function code 102, 104, manage the operation of the building and maintenance of data warehouse 100, manage the data flow across the systems 110–112 and manage the constructing and maintaining of the data warehouse 100.

A presently preferable embodiment according to the present invention provides data warehouse 100 defined by data warehouse builder 109. Data warehouse 100 provides support for customer-centric data analysis and customer-centric decision making. Data warehouse 100 can accept data from a plurality of sources, as represented by arrow 112 of FIG. 1, such as data sources 101. Data sources can include existing legacy database systems, existing business applications, legacy accounting, management information systems and the like. This data warehouse is defined according to data schema 107 generated by the data warehouse builder 109.

Data sources 101 represents one or more legacy systems having original customer data. Typically, these legacy systems are operational systems that support an enterprises' day to day operations. Typically, data 112 derived from these data sources can be in any of a wide variety of different formats, such as flat files, ASCII files, relational database tables and the like. Embodiments according to the present invention provide the capability to pre-process the data before incorporating it into the data warehouse. Additionally, the present invention provides techniques for incorporating data 112 into the customer-centric data warehouse 100. Data 112 can be consolidated, transformed and formatted based on one or more of a plurality of mapping rules 106 by data warehouse builder 109 before being moved into the data warehouse and populated into the data base.

Customer data analysis functions 102, 104 can access data populated in the customer-centric data warehouse to analyze customer behaviors, business activity correlation patterns, and the like. Customer data analysis functions 102, 104 can include market basket analysis for customer buying behavior, customer valuation analysis, customer segmentation and the like. Customer data analysis functions comprise static meta-data-aware customer analysis functions 102 and dynamically generated customer data analysis functions 104. These analysis functions can analyze database contents providing insight into the operations of the enterprise.

In a particular embodiment according to the present invention, meta-data-aware customer analysis functions 102 can be provided as built in functions. Such functions can access meta data, such as meta data stored in meta data repository 105 of data warehouse builder 109. In a presently preferable embodiment, meta data repository 105 can include information about a data schema. Such meta data enables accessing applications to understand and retrieve data located in customer centric data warehouse 100.

In a particular embodiment according to the present invention, a data warehouse builder, such as data warehouse builder 109 generates code for one or more of a plurality of dynamically generated customer data analysis functions 104 based in part upon a plurality of meta data information 105, as illustrated by arrow 108 of FIG. 1. Meta data information can be embedded in the generated code by the data warehouse builder 109.

Customer data analysis applications 103 comprise front-end business applications adapted to use analysis functions, such as analysis functions 102, 104. These applications manipulate information related to customers and especially information that correlates customers' business transactions and other activities. Electronic commerce applications, sales force automation applications, customer service applications, marketing automation applications are examples of applications using customer data analysis functions.

Figure 2:
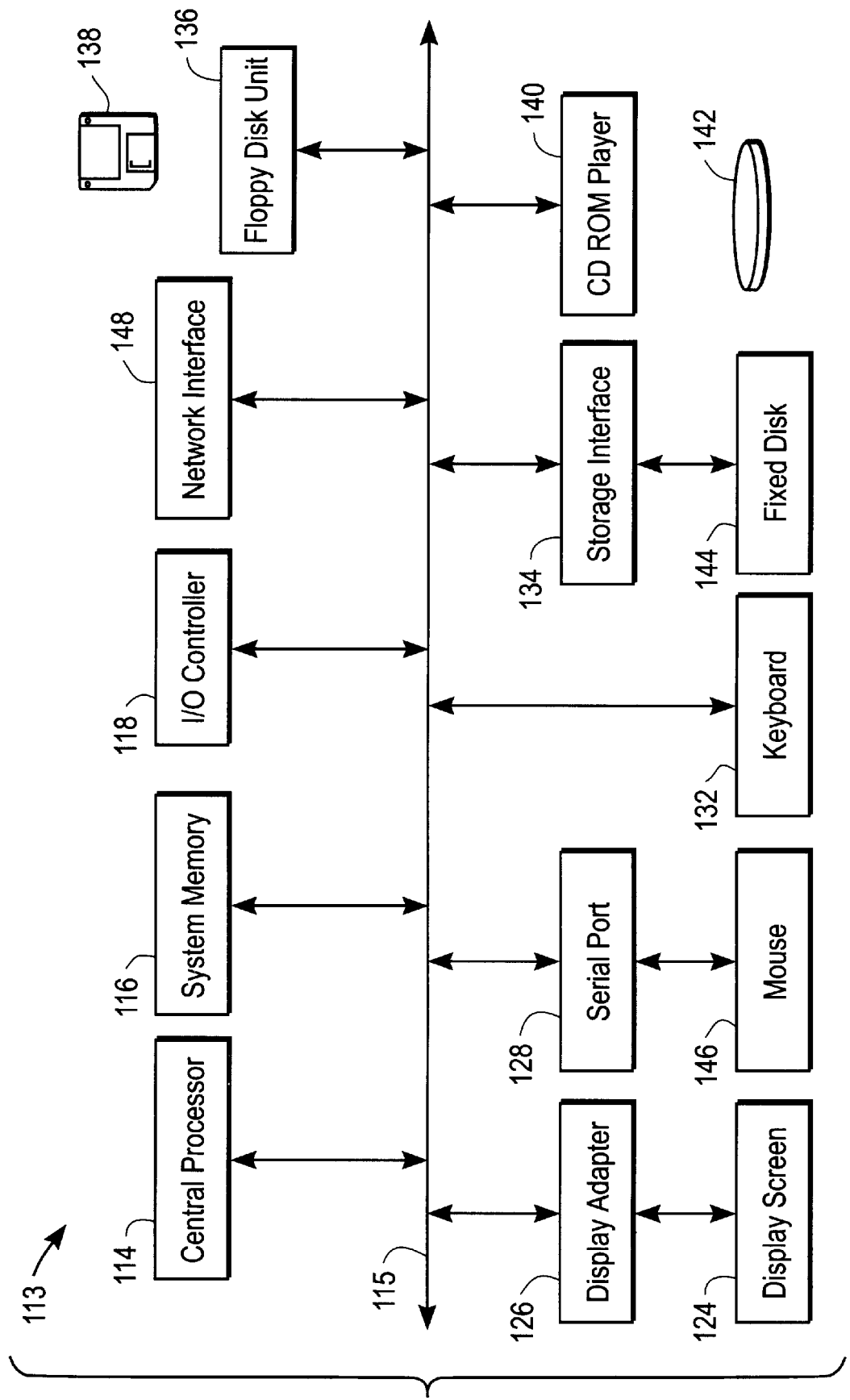
FIG. 2 illustrates a representative computer system suitable for implementing a particular embodiment according to the present invention.

FIG. 2 depicts a representative computer system suitable for implementing a particular embodiment according to the present invention. This diagram is merely an illustration and should not limit the scope of the claims herein. One of ordinary skill in the art would recognize other variations, modifications, and alternatives. FIG. 2 shows basic subsystems of a computer system 113 suitable for use with the present invention. In FIG. 2, computer system 113 includes a bus 115 which interconnects major subsystems such as a central processor 114, a system memory 116, an input/output controller 118, an external device such as a printer (not shown), a display screen 124 via a display adapter 126, a serial port 128, a keyboard 132, a fixed disk drive 144 and a floppy disk drive 136 operative to receive a floppy disk 138.

Many other devices may be connected such as a scanner (not shown) via I/O controller 118, a mouse 146 connected to serial port 128 or a network interface 148. Many other devices or subsystems (not shown) may be connected in a similar manner. Also, it is not necessary for all of the devices shown in FIG. 2 to be present to practice the present invention, as discussed below. The devices and subsystems may be interconnected in different ways from that shown in FIG. 2. The operation of a computer system such as that shown in FIG. 2 is readily known in the art and is not discussed in detail in the present application. Source code to implement the present invention may be operably disposed in system memory 116 or stored on storage media such as a fixed disk 144 or a removable disk 138 or a CD ROM.

In a presently preferable embodiment according to the present invention, a novel reverse star schema data model provides customer data analysis capabilities not provided by techniques heretofore known in the prior art is operably disposed in the system memory 116 or fixed disk 144 of system 113 of FIG. 1. Customer data analysis can include, but is not limited to, decision support analysis that relates business decisions to customer behavior. Customer data analysis applications can analyze data based on customer identity and correlate customer activities, events, transactions, and status to the customers' identity. Approaches, such as decision support applications, summarizing techniques and the like can also be used without departing from the scope of the present invention.

A data model represents an organization of data in a database. Choice of a data model facilitates the use of data in certain ways and may limit the use of data in others. Applications built to work with a particular data model can be quite incompatible with other data models. Often, these applications are re-implemented for databases having different data models even though the underlying logic of the application may be similar. A meta model is an abstract data model that describes relationships between different entities or groups of entities in a data model. Different business applications can customize a data model by following the relationships described in the meta model. Database applications can be written to conform to a meta model and refer to the detailed data model through means such as a data dictionary when necessary. These and other techniques according to the present invention enable application code to be reusable.

Figure 3A:
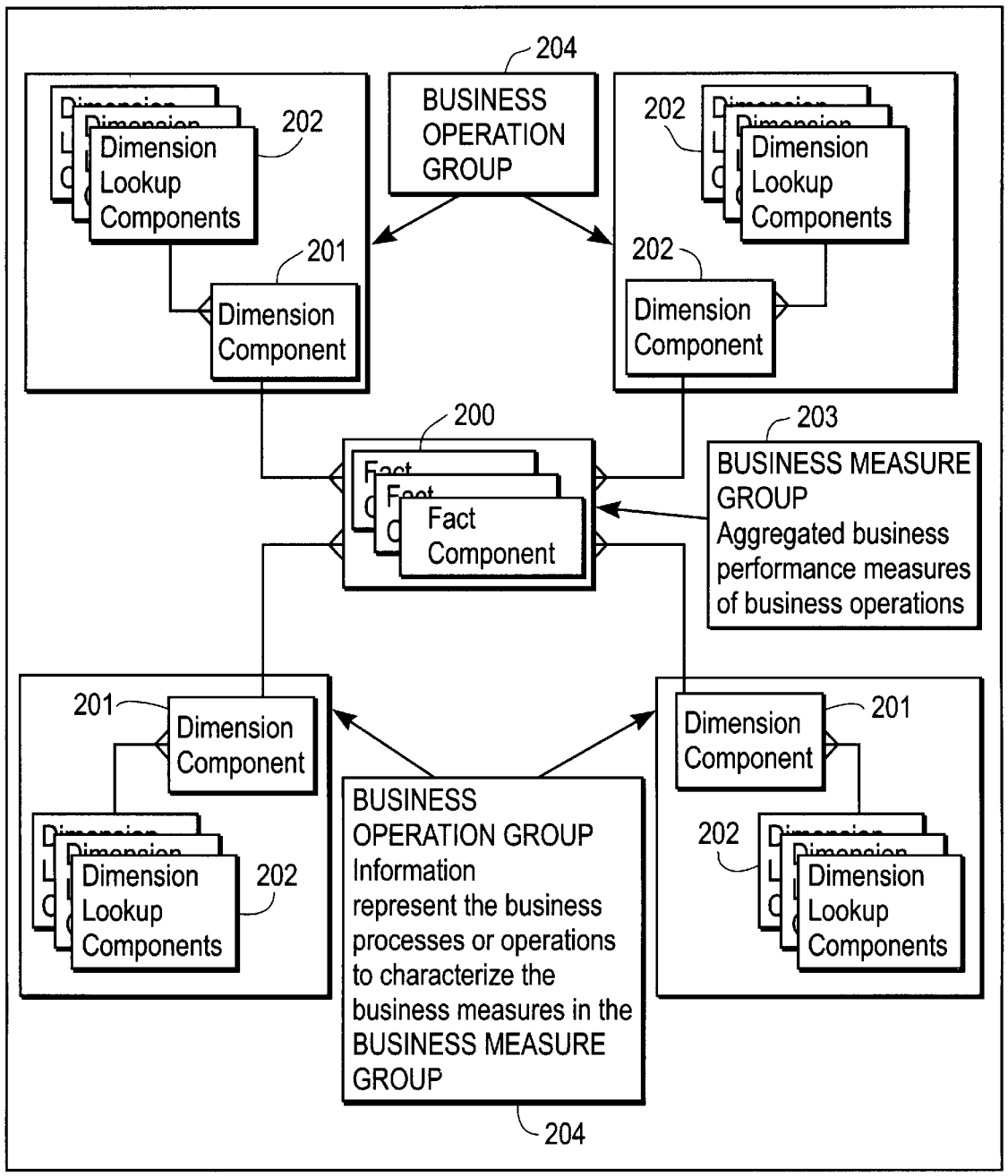
FIGS. 3A–3B illustrate representative meta models in particular embodiments according to the present invention.

FIG. 3A illustrates a simplified entity-relationship diagram of a representative meta model having a star schema organization according to a particular embodiment of the present invention. This diagram is merely an illustration and should not limit the scope of the claims herein. One of ordinary skill in the art would recognize other variations, modifications, and alternatives. A business measure group 203 represents aggregate business performance measures for a business operation. The business measure group 203 may comprise one or more "fact components", such as fact component 200. Fact components represent specific measurements in various business subject areas that enterprise decision makers want to analyze. For example, common fact components can include many business performance measurements such as sales amounts, gross margins sales quantities and the like. FIG. 3A depicts a plurality of business operation groups 204 which represent business processes or operations that index or describe the measures in business measure group 203. Embodiments can have any number of business operations groups, such as business operation groups 204 of FIG. 3A. Business operation group 204 comprises one or more dimension components 201, one or more dimension lookup components 202 and others. Dimension components 201 represent particular business operations that characterize data in fact components. For example, items such as products, sales channels and the like can be dimensions for a sales fact. Dimension lookup components 202 describe detail information about dimension components 201. For example, items such as product categorization, product styles and the like can be dimension lookup components corresponding to a product dimension component.

Embodiments employing star schema data models are useful for providing macroscopic perspective of business operation. Embodiments providing such macroscopic perspective enable a decision support system to provide decision-related information using a "big picture" as a guideline. Accordingly, star schema based embodiments can provide a static solution based upon pre-defined dimensions and summarized data. Data aggregation provided by embodiments having a star schema can provide a high level analysis perspective because of the nature of the multi-dimensional model.

Figure 3B:
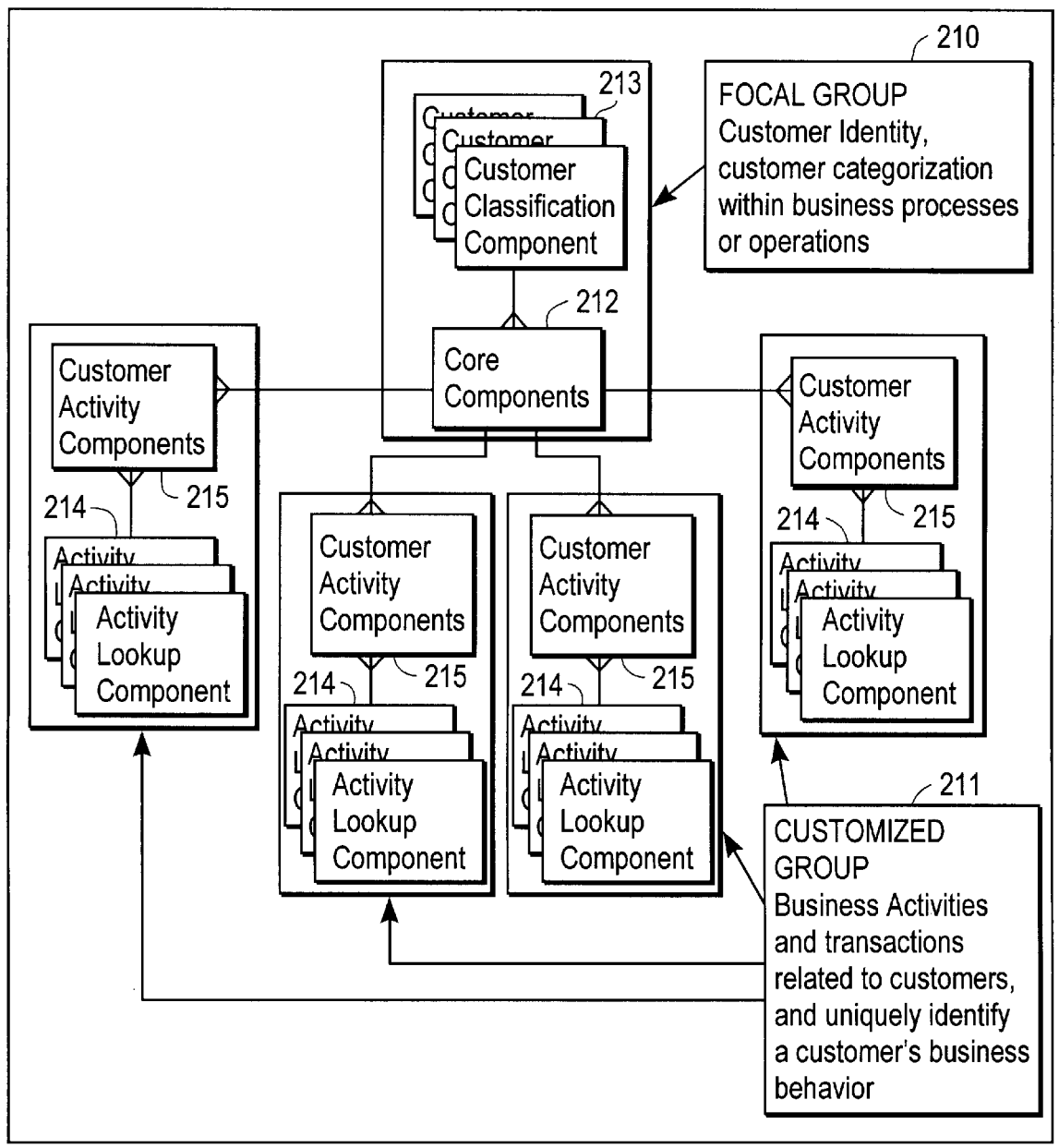

FIG. 3B illustrates a representative meta model for a reverse star schema in a particular embodiment for performing customer data analysis according to the present invention. This diagram is merely an illustration and should not limit the scope of the claims herein. One of ordinary skill in the art would recognize other variations, modifications and alternatives. Many customer data analyses correlate customer events or activities from different business operations across one or more areas of an enterprises' activities. In a particular embodiment, customer data analysis involves correlating different activities within different customer activity components, such as customer activity components 215 of FIG. 3B. These analyses can correlate customer activities through a plurality of core components, such as core components 212. Data in core components 212 can be used as identifying entities for customer activities from different customer activity components. In some embodiments, data analyses operate on a more detailed level of customer activities. These embodiments search one or more activity lookup components, such as activity lookup components 214, for more detailed customer activity data. The data in customer classification components provides different ways to categorize customers or different business views of the customers. For example, customers can be categorized by geographic region, demographics and the like. Embodiments using one or more of these types of customer classification components can provide a plurality of useful possible ways of viewing customer data analysis results. Embodiments employing a reverse star schema provide a detail level view for data that provides the capability to perform analysis based on concepts such as customer data, customer activities and their correlation at the transaction or event level.

Figure 4A:
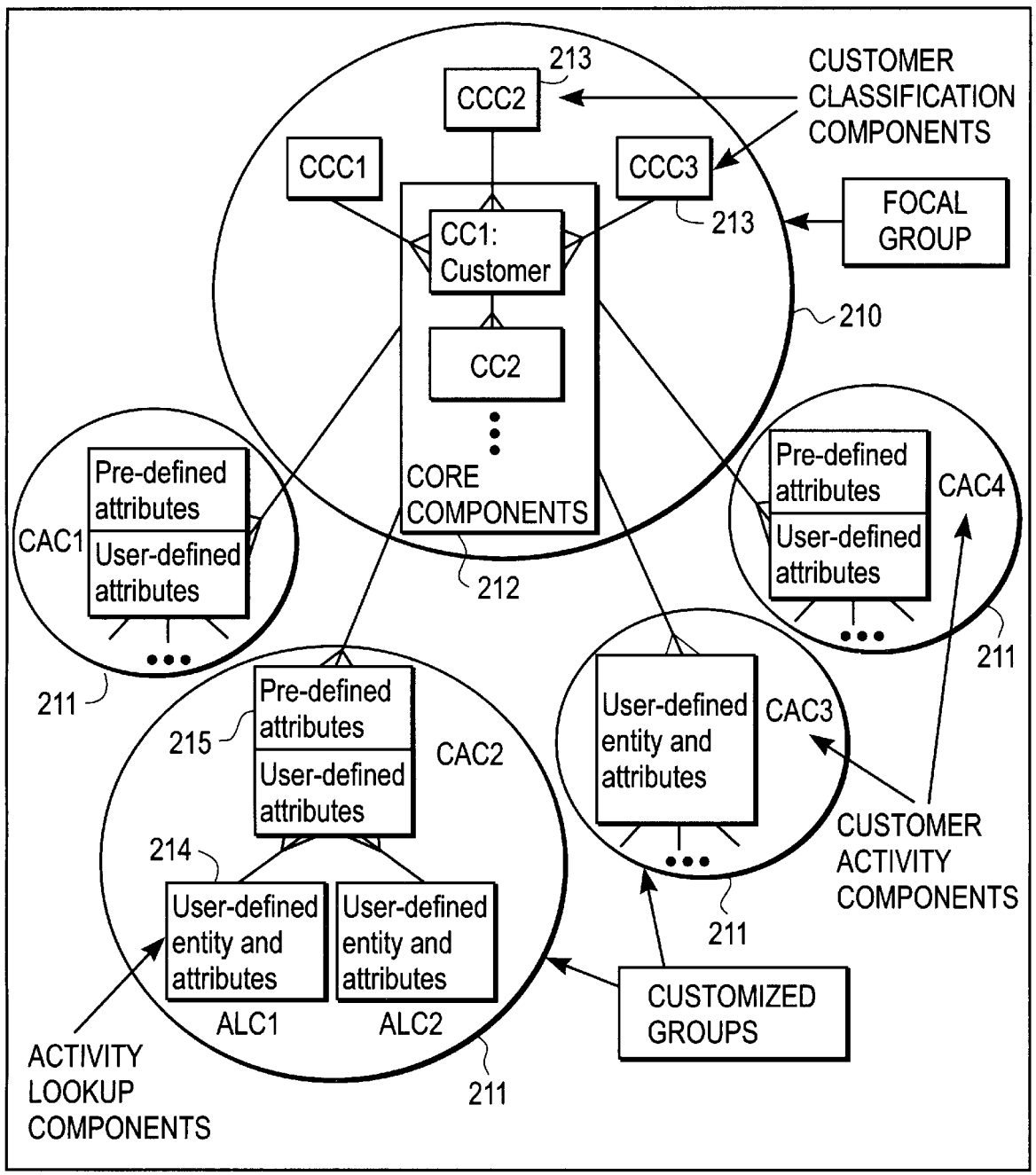
FIGS. 4A–4B illustrate representative data models in particular embodiments according to the present invention.

FIG. 4A illustrates a simplified general form of a representative data model in a particular embodiment according to the present invention. This diagram is merely an illustration and should not limit the scope of the claims herein. One of ordinary skill in the art would recognize other variations, modifications, and alternatives. The data model of FIG. 4A is a data model having a reverse star schema organization. FIG. 4A illustrates a representative data model comprising a focal group 210, comprising at least one of a plurality of core components 212, at least one of a plurality of customer classification components 213, at least one of a plurality of customized groups 211, at least one of a plurality of customer activity components 215 and at least one of a plurality of activity lookup components 214. Other components can also be included, and not all of the components illustrated need be present in some embodiments without departing from the scope of the present invention.

A focal group, such as focal group 210, for example, includes components that describe information such as customer characteristics, profiles, business related classifications, customers' roles, definitions and the like in different business functional areas. FIG. 4A illustrates two types of components in focal group 210. Other components can also be included without departing from the scope of the present invention. FIG. 4A. illustrates core components 212, and customer classification components 213. Core components 212 include a Customer entity (CC1) and other related customer identity data designated by (CC2–CCn). Information such as an account identifier, social security number, encrypted name, and the like are examples of such customer identity data. These entities can be especially useful in performing customer event correlation analysis. Customer classification components 213 describe information about the customers' roles or positions in the business organizations or processes. These descriptive components can be related to the structure or organization of a customers' business, for example, information such as region, channel, sales organization and the like, or to characteristics of the customer, such as business profile, demographics, current profile, and the like.

The components of customized group 211 correspond to various forms of operational business transactions. As event transactions can be scattered over time, these components comprise a set of business measures and attributes. These events can be independent as well as dependent from one another. A particular sequence of events can be used to describe different stages of customer activity. For example, in a particular time period, a customer may go through a sequence of events such as: subscription>billing>payment>promotion>price plan change>service call>cancellation. Each event can involve a plurality of different business processes or operations that reflect a lifecycle of a customer.

Customized group 211 comprises a plurality of customer activity components 215, a plurality of activity lookup components 214 and the like. Customer activity components 215 can represent event transactions or measures about customer activities. These entities can comprise one or more attributes, such as a transaction type, a transaction timestamp and others. When customer activity components 215 are defined, a domain value for a transaction type is selected. Transaction type is an attribute useful for event correlation analysis. In one particular embodiment, users can define customer activity components, such as customer activity components 215, by selecting attributes from a plurality of pre-built attributes. Some embodiments can also provide the capability to add user-defined attributes. Many embodiments provide the capability to define customer activity entities (e.g., CAC3 in FIG. 4A). Activity lookup components 214 represent entities that detail characteristics of customer event transactions. For example, products purchased in a transaction, store location of purchase and the like can be stored as activity lookup entities 214 for analysis.

Figure 4B:
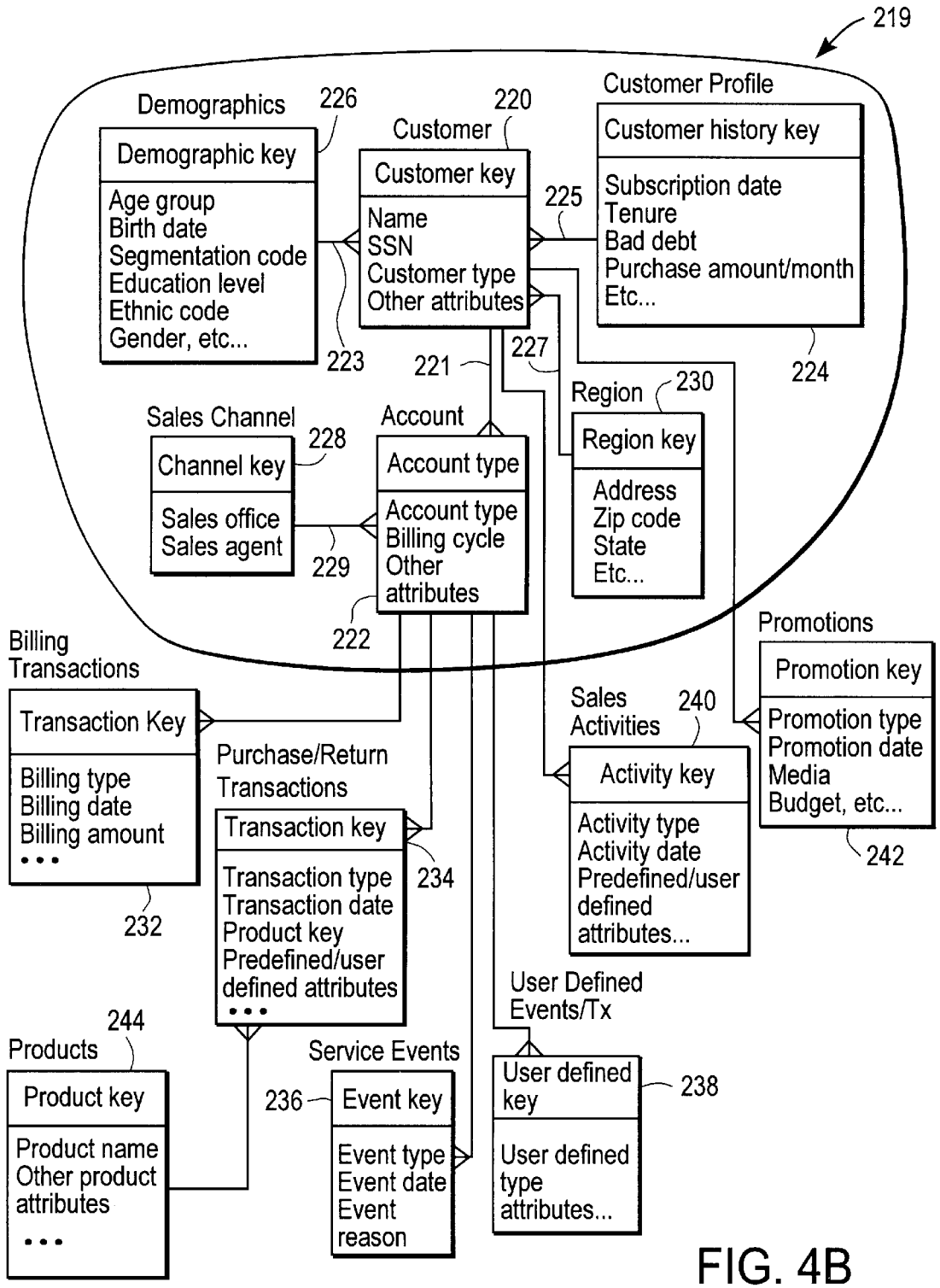

FIG. 4B illustrates a simplified entity relationship diagram of a representative example of a data model having a reverse star schema organization in a particular embodiment according to the present invention. This diagram is merely an illustration and should not limit the scope of the claims herein. One of ordinary skill in the art would recognize other variations, modifications, and alternatives. In the example data model of FIG. 4B, core components 212 of FIG. 4A comprise a customer entity 220 and an account entity 222. Arrow 221 indicates a one to many relationship between customer entity 220 and account entity. The presence of entities such as customer entity 220 and account entity 222 enables data model 219 to provide account level concepts for queries relating to customers in the business model under consideration. FIG. 4B illustrates customer classification component 213 of FIG. 4A comprising a plurality of entities, of which four are illustrated: A sales channel entity 228 a customer region entity 230, a customer profile entity 224 and a demographics entity 226. Many embodiments can include other entities, or include some but not all of these entities without departing from the scope of the present invention.

In a particular representative embodiment, demographics entity 226, customer profile entity 224 and customer region entity 230 have relationships with customer entity 220. For example, as illustrated in FIG. 4B, arrow 223 indicates a many to one relationship between customer entity 220 and demographics entity 226. Similarly, arrow 225 indicates a many to one relationship between customer entity 220 and customer profile 224; arrow 227 indicates a many to one relationship between customer entity 220 and region entity 230. Further, in this particular embodiment, sales channel entity 228 has a one to many relationship with account entity 222, as indicated by arrow 229 in FIG. 4B.

In the particular representative embodiment illustrated by FIG. 4B, a plurality of different entities comprise customer activity components 215 of FIG. 4A. These entities include a billing transactions entity 232, a purchase/return transactions entity 234, a service events entity 236, a sales activities entity 240, a promotions entity 242 and a user defined events 238. Further, FIG. 4B illustrates an activity lookup component, which comprises a products entity 244. Other entities not shown or described here can also be included in some embodiments according to the present invention. Further, some embodiments may not provide all the entities described here, without departing from the scope of the present invention.

Figure 5A:
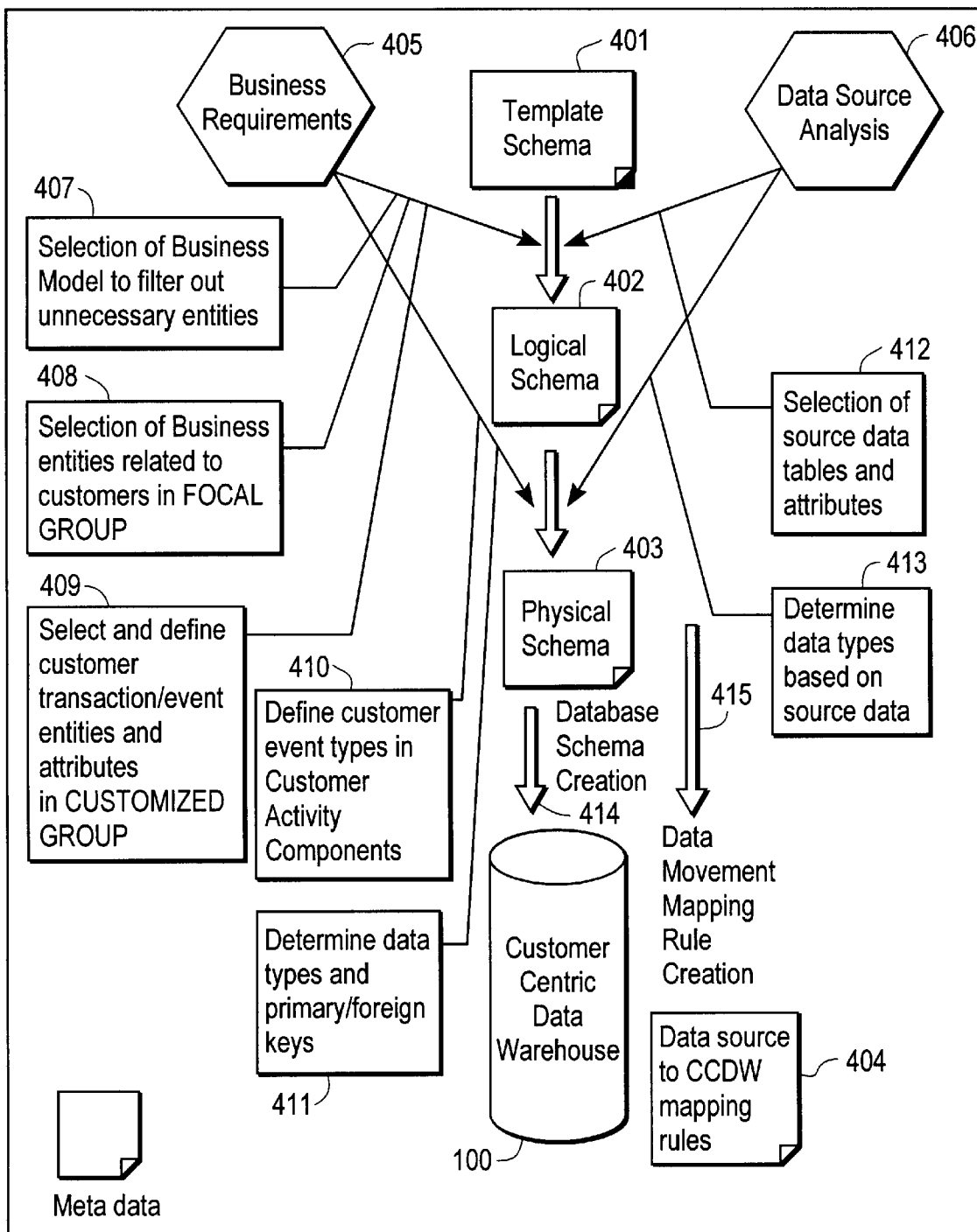
FIGS. 5A–5B illustrate representative flowcharts of simplified process steps according to an embodiment of the present invention.

FIG. 5A illustrates a simplified process block diagram of a representative process for customizing a data model in a particular embodiment according to the present invention. This diagram is merely an illustration and should not limit the scope of the claims herein. One of ordinary skill in the art would recognize other variations, modifications, and alternatives. In the embodiment of FIG. 5A, a template schema 401 is converted to a physical schema 403 that can be used to create a customer-centric data warehouse, such as customer centric data warehouse 100. In a particular embodiment according to the present invention, a user customizes features of his or her data warehouse based on characteristics of his or her particular application and the availability of source data, as illustrated by business requirements 405 and data source analysis 406 in FIG. 5A.

A template schema 401 comprising a template for a data schema can comprise a plurality of entities providing support for a broad array of different types of applications. Entities and attributes that are not relevant to a particular application can be excluded by processes such as selection of a business model 407, selection of business entities 408 and selection and definition of customer transaction event entities and attributes 409 to form a customized group, such as customized group 211 of FIG. 4A. Furthermore, new entities can be added to a particular business model. A logical schema 402 can be a logical data model that comprises useful entities and attributes, including built-in and customized ones. Processes such as selection of a business model 407, selection of business entities 408 and selection and definition of customer transaction event entities and attributes 409, and selection of source data and attributes 412 provide input to construct logical schema 402 from template schema 401. A physical schema 403, which can include events or other transaction types, can be used to make a customer-centric data warehouse by data type definitions 411, 413, determination of primary keys and foreign keys 411, and defining customer event types 410. Further, in a particular embodiment, a plurality of mapping rules 404 can be used to map data sources, such as data sources 101 to a customer-centric data warehouse, such as customer centric data warehouse 100. Mapping rules 404 comprise meta data that describes how the data in external sources can be mapped to the data table and attributes in the data warehouse. Mapping rules 404 can further comprise a plurality of transformation rules in some embodiments.

Figure 5B:
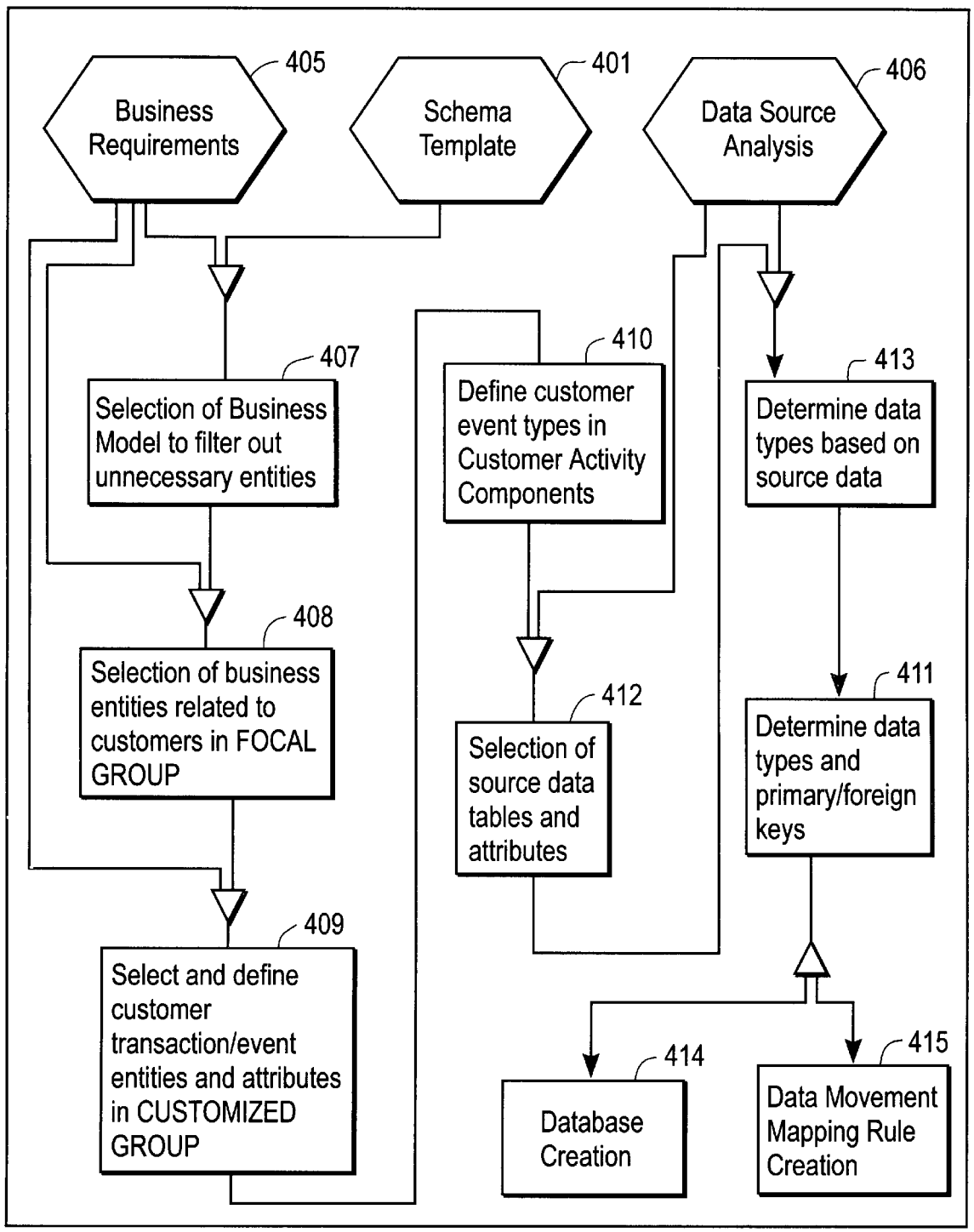

FIG. 5B illustrates a representative flow diagram of a simplified process for generating a data model having a reverse star schema organization in a particular embodiment according to the present invention. This diagram is merely an illustration and should not limit the scope of the claims herein. One of ordinary skill in the art would recognize other variations, modifications, and alternatives. FIG. 5B illustrates a first step 407, wherein a business model template is selected. Selection of a business model can eliminate unnecessary entities from further consideration. In this step, a pre-defined business model is selected from a plurality of such pre-defined business models. Different applications can use different business models having entities relevant to their business processes and operations. In a presently preferable embodiment, users can select from a plurality of pre-built entities in a template for a particular data schema 401 based upon business requirements 405 relevant to the business of the user. Then, in a step 408, customer entities are selected from a plurality of pre-defined customer entities in a focal group, such as focal group 210 of FIG. 4A. This eliminates more non-relevant entities from further consideration. Entities to be included in core components 212 and customer classification components 213 can be selected based upon fit to users' needs based on their business processes and operations.

In a step 409, customer transactions and event entities and their attributes are defined, creating a customized group, such as customized group 211 of FIG. 4A. Users may select event transaction entities for customer activity components that are relevant to characteristics of the user's application. In a particular embodiment, users can also define their application-specific entities in customer activity components 215. In some embodiments, users can choose from among a plurality of pre-defined attributes, as well as defining their own attributes. Entities in customer activity components 215 link to more detailed information that can be accessed through a plurality of activity lookup components 214 that can be defined. Activity lookup components 214 can comprise, for example, business entities referenced in business transactions, such as products, stores, and the like.

In a step 410, a plurality of customer event types are defined in customer activity components. In many embodiments, users can define event transaction types that will be used in customer activity components, such as customer activity components 215 of FIG. 4A. In many embodiments, these event transaction types can be used as domain constraints when the data warehouse is created. Some embodiments provide event transaction types as attribute values for customer event correlation queries in customer data analysis.

In a step 412, a plurality of source data tables and attributes are selected to match selected entities, such as the entities selected in 407. In some embodiments, users can browse and navigate through a data model of a data source, such as source data 101, to select data tables and attributes to comprise the source of the data tables and attributes of the customer-centric data warehouse.

In a step 413, a plurality of data types is determined based on source data, such as source data 101 of FIG. 1. Data types of tables and attributes in the customer-centric data warehouse can be derived based on data types in the source tables. Many embodiments provide the capability to automatically derive these data types. Some embodiments also provide the capability to users to make changes to the automatically derived ones.

In a step 411, data types and primary keys and foreign keys, if needed, are determined. In a particular embodiment, data types, primary and foreign key relationships can be finalized. This can be accomplished using any number of techniques known to persons of ordinary skill in the art, such as for example, using a database design tool called ERWin/ERX by Platinum Technologies, Inc., a company headquartered in Oakbrook Terrace, Ill. However, other equivalent products or methods can also be used without departing from the scope of the present invention.

In a step 414, a customer-centric data warehouse database is created from the schema created in step 411. The data warehouse builder 100 can construct the customer-centric data warehouse based upon the schema 403 and database configuration information provided by a user. The data warehouse builder employs database commands and programming interfaces to accomplish building the data warehouse.

In a step 415, a plurality of data movement mapping rules is created. Mapping rules provide information about translation of information in tables and attributes of data sources, such as data sources 101, to a customer-centric data warehouse, such as the customer centric data warehouse created in step 414. This can be accomplished using any number of techniques known to persons of ordinary skill in the art, such as for example, using a database design tool called EXTRACT by Evolutionary Technologies International, a company with headquarters in Austin, Tex. However, other equivalent products or methods can also be used without departing from the scope of the present invention.

Figure 6A:
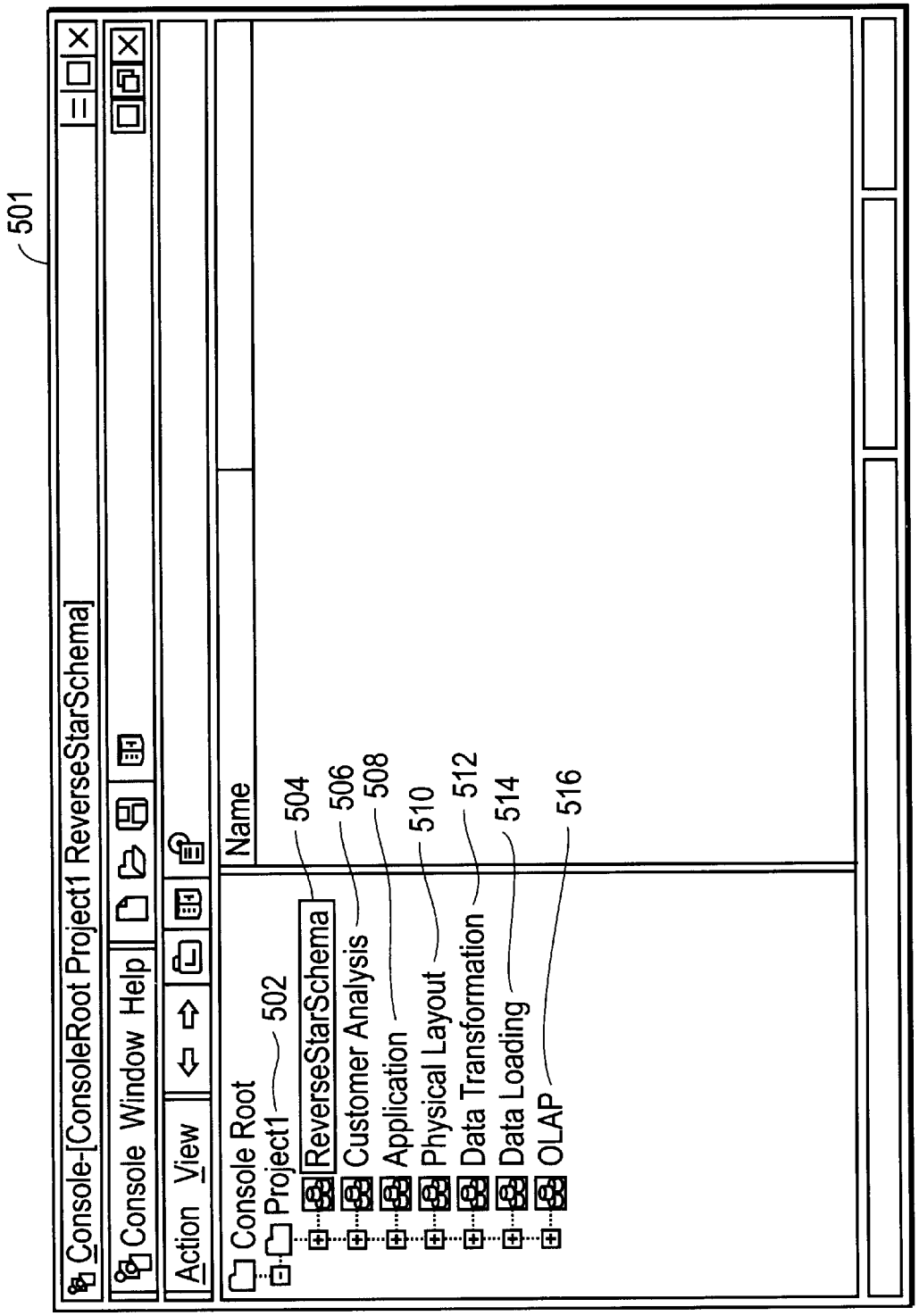
FIGS. 6A–6F illustrate representative user interface screens in a particular embodiment according to the present invention.

FIGS. 6A–6F illustrate simplified user interface screens in a representative data warehousing method in a particular embodiment according to the present invention. These diagrams are merely illustrations and should not limit the scope of the claims herein. One of ordinary skill in the art would recognize other variations, modifications, and alternatives. FIG. 6A illustrates a project screen 501 having a hierarchical view of functional components in a particular embodiment according to the present invention. A first level includes a "project" folder 502 having components for a creating a data warehouse for a particular enterprise. Under the project level is a component level having a plurality of components belonging to the parent project folder. A first component 504 of "reverse star schema" is highlighted. The highlighting indicates that this component is the next component to be defined. Other components include a customer analysis component 506, an application component 508, a physical layout component 510, a data transformation component 512, a data loading component 514, and an OLAP component 516. Other components can be included in many embodiments without departing from the scope of the present invention. If the user selects choice 504, a business model dialog box appears.

Figure 6B:
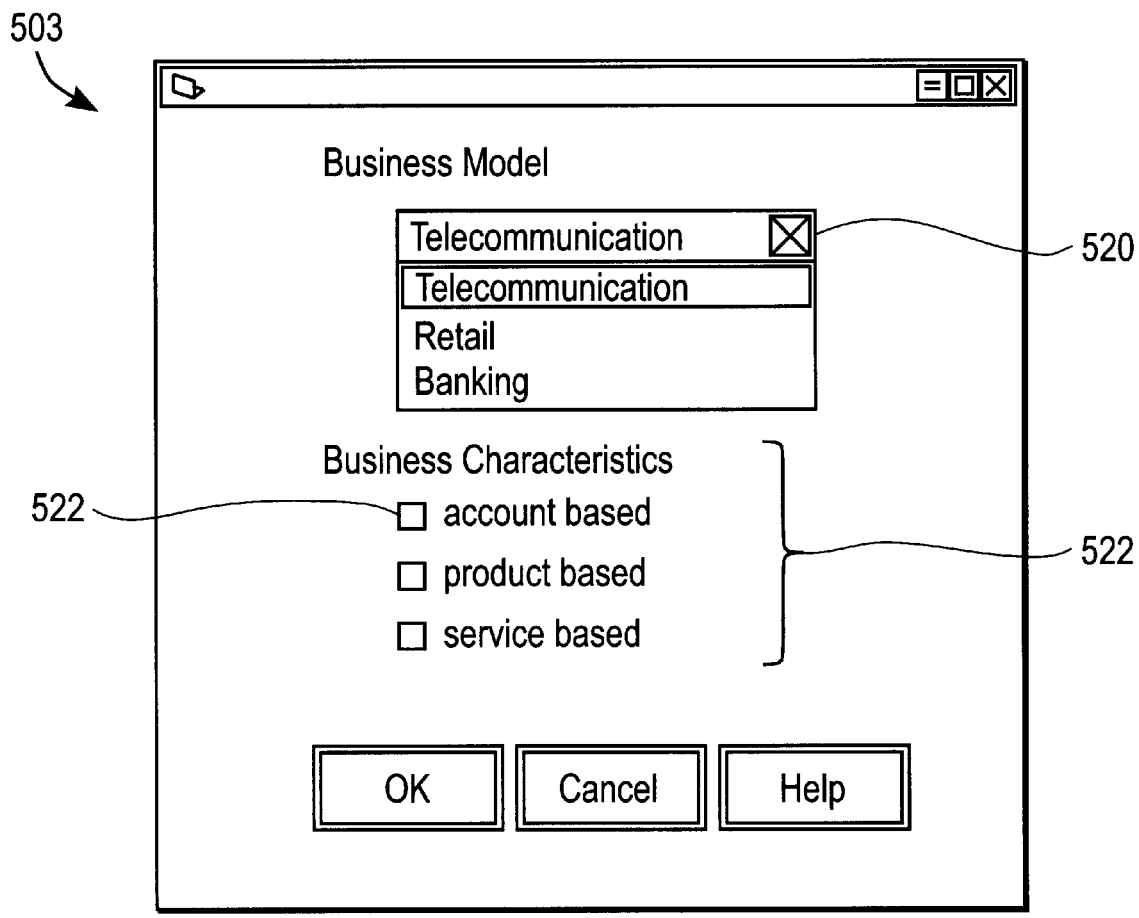

FIG. 6B illustrates a business model dialog box 503 in a particular embodiment according to the present invention. Dialog box 503 is displayed whenever the "reverse star schema" component 504 is selected from project starting screen 501. Dialog box 503 enables the user to customize business templates based on prevailing business models in a particular industry. Dialog box 503 comprises a business model selection field 520 illustrating that the user is selecting a business model for the telecommunications industry. A plurality of business characteristics are prompted using check boxes 522, including whether the business is account, product or service based. Entering the appropriate information and clicking the "OK" button causes the embodiment to present a database creation screen.

Figure 6C:
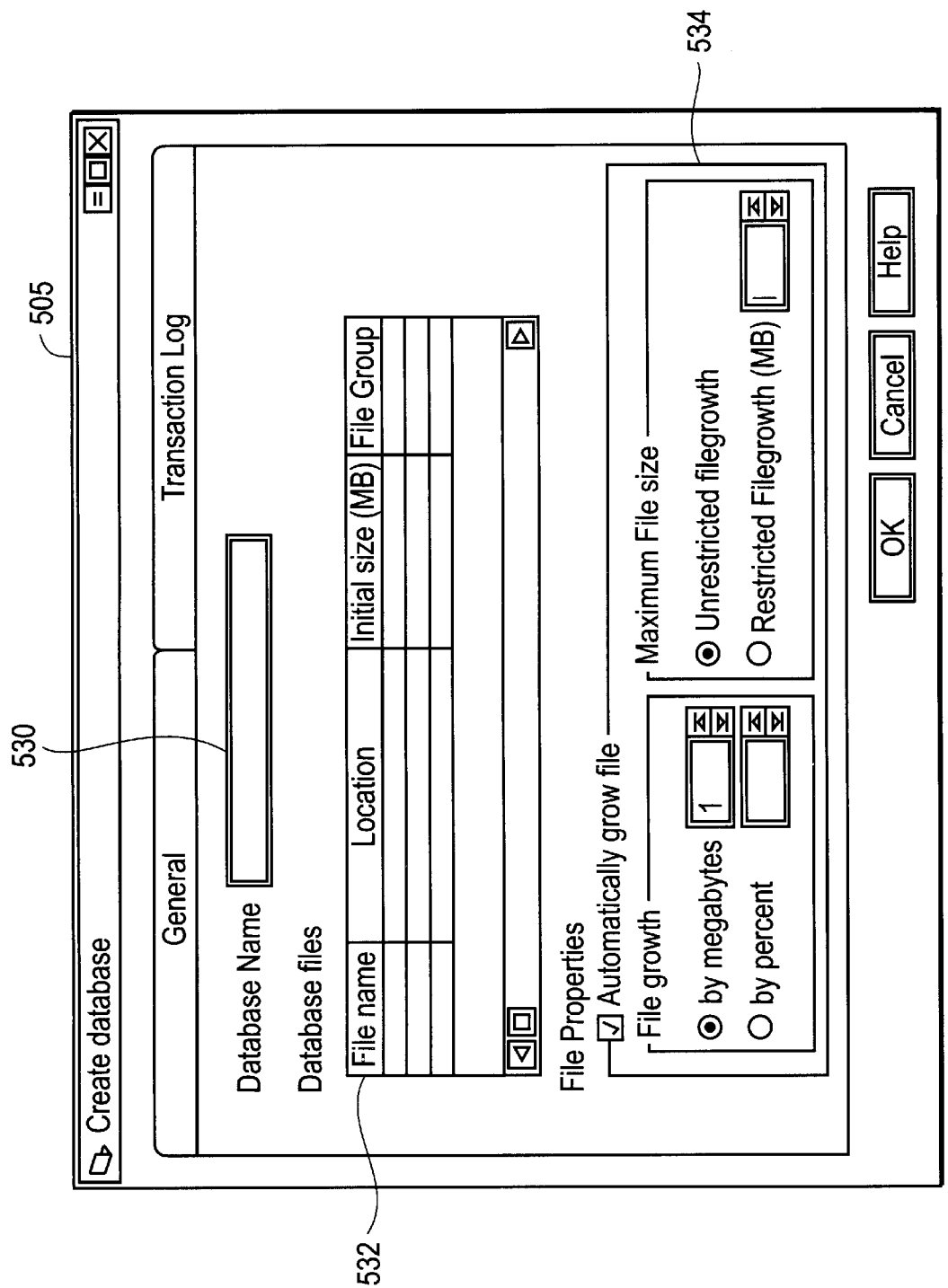
Figure 6D:
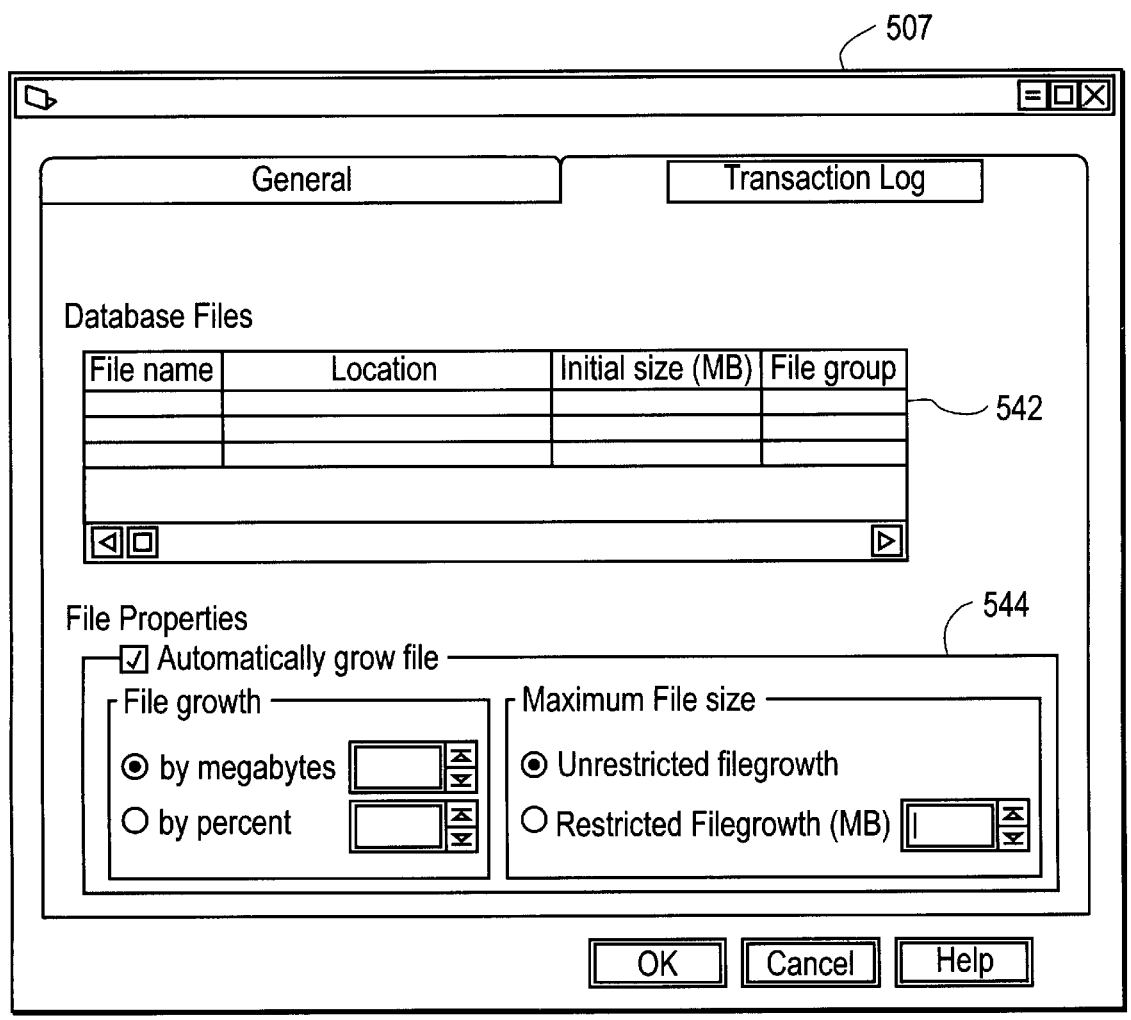

FIG. 6C illustrates the contents of a general tab of database creation screen 505. Screen 505 includes a database name field 530, a database files area 532 and a file properties area 534. The user enters information appropriate for these fields and clicks the "OK" button. The user can select a transaction tab to display screen 507 in FIG. 6D. Screen 507 includes fields to enter information about the kind and size of a database transaction log, including a files area 542 and a file properties area 544. The user enters information appropriate for these fields and clicks the "OK" button. The user can then move to the reverse star schema customization screen.

Figure 6E:
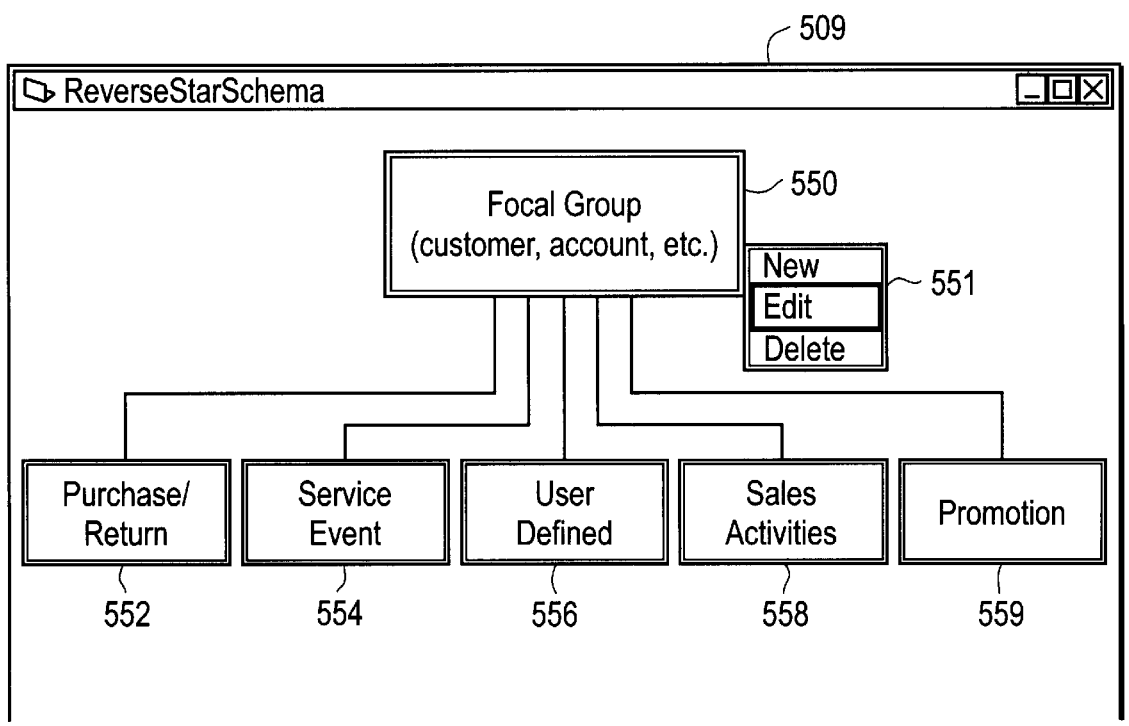

FIG. 6E illustrates a reverse star schema customization screen 509 in a particular embodiment according to the present invention. Customization screen 509 illustrates a focal group 550 displayed to a user. The user can highlight a specific group, such as focal group 550, prompting the embodiment to present detail information about the group for editing and the like. A selection box 551 enables the user to select whether a new group is to be added or an existing group is to be edited or deleted. Focal group 550 includes a plurality of tables 552–559. The user can add new tables or edit existing tables within the group, plan for layout, identify data sources and specify data transformation for each table or column, or plan for data loading for a table.

Figure 6F:
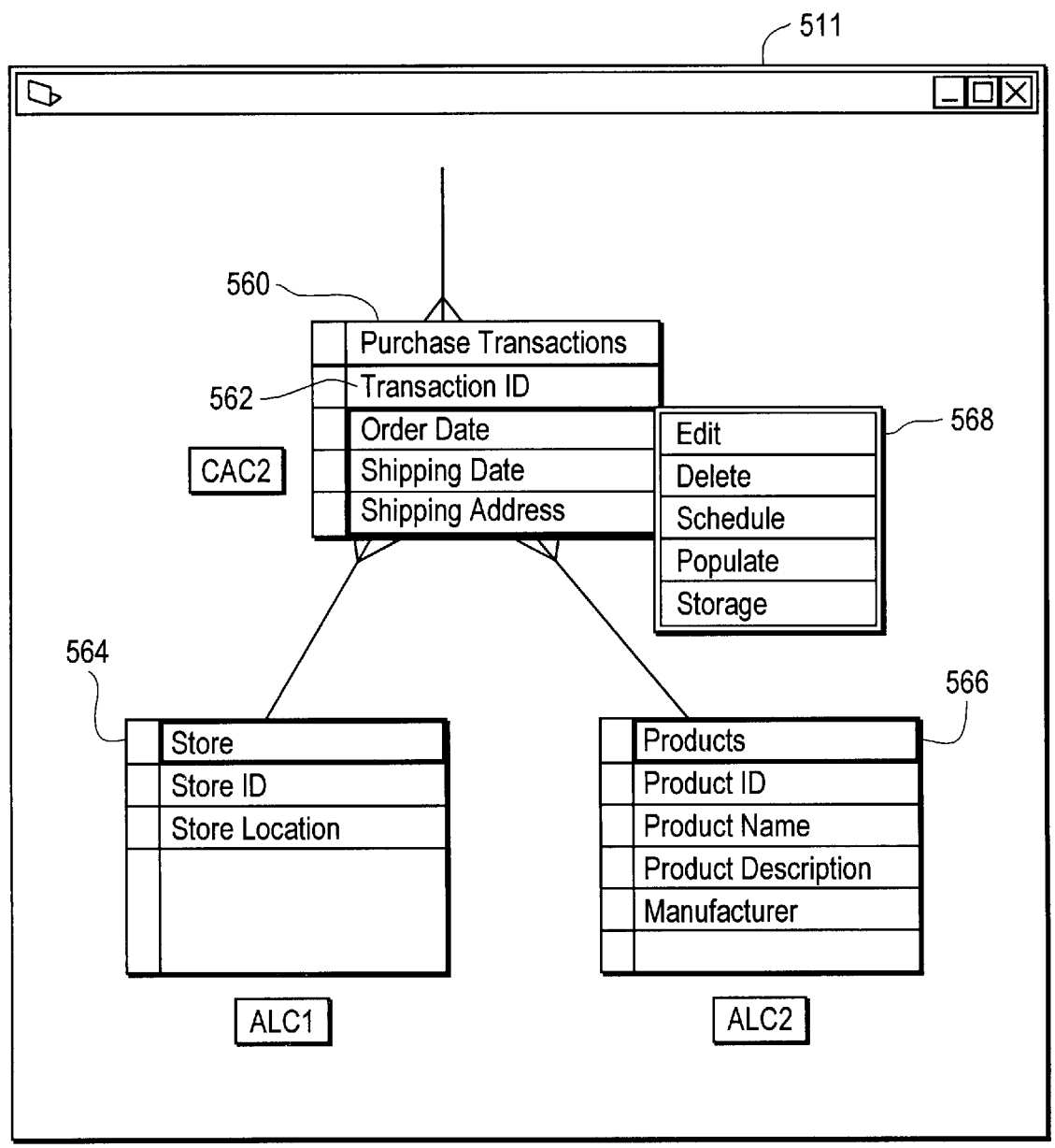

FIG. 6F illustrates a data schema customization screen 511 in a particular embodiment according to the present invention. Customization screen 511 illustrates a customized group 560 displayed to a user. Customized group 560 includes a plurality of entities, such as highlighted entity 562 that provides a "transaction id". Customization group 560 has relationships with activity lookup group 564 and activity lookup group 566. A selection box 568 enables the user to define and configure further entities and activity lookup groups.

FIGS. 6A–6F illustrate a user interface in a particular embodiment according to the invention. The embodiment of FIGS. 6A–6F can provide for a reverse star schema data model. However, other data models and organizations of data can be used without departing from the scope of the present invention.

Figure 7A:
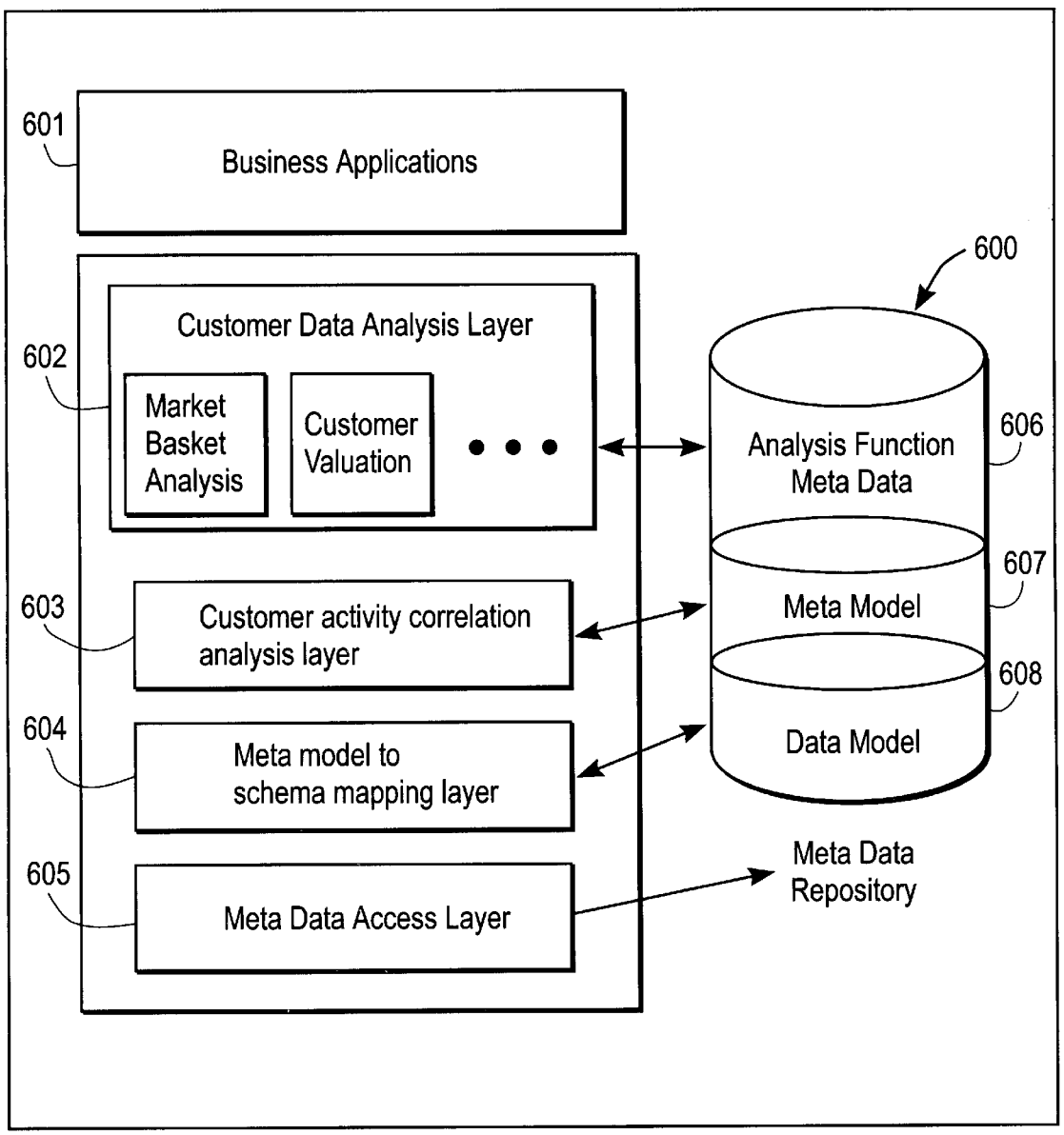
FIGS. 7A–7B illustrate representative data analysis functions in particular embodiments according to the present invention.

FIG. 7A illustrates representative customer data analysis functions, such as the customer data analysis functions 102, 104 of FIG. 1, in a particular embodiment according to the present invention. This diagram is merely an illustration and should not limit the scope of the claims herein. One of ordinary skill in the art would recognize other variations, modifications, and alternatives. Customer data analysis can comprise a plurality of customer data analysis types, such as customer purchasing behavior analysis, customer (market) segmentation, customer valuation, customer churn analysis, and the like. Such analyses can be integrated with the meta model of the data schema described above. These functions can be operative across different business applications and embodiments using the same data model.

FIG. 7A depicts a representative plurality of customer analysis functions divided into different layers of software in a particular embodiment according to the present invention. Many other embodiments can be envisioned by one of ordinary skill in the art, that will arrange these functional layers in different order, add functions or delete functions without departing from the scope of the present invention. A meta data access layer 605 provides the functionality of communicating and accessing meta data from a meta data repository, such as meta data repository 600 and the like. A mapping layer 604, lying between meta model and data schema, provides the capability to translate entities from a meta model to a data schema to form a database. In many embodiments, an SQL query can then be generated to query the resulting database.

A customer activity correlation analysis layer 603 provides the foundation of customer data analysis in layer 602. Layer 603 provides the capability for customer activity correlation queries to access the database of a customer-centric data warehouse. Layer 603 references the meta model 607 in meta data repository 600 to determine the data schema of data in the customer-centric data warehouse.

Customer data analysis layer 602 provides customer data analysis functions. Layer 602 comprises components that can analyze information about the customers. These customer analysis components can comprise a market basket analysis function, a customer valuation function and the like. The result of the analysis performed by the customer data analysis functions 602 can be used by business applications 601. Customer data analysis functions can provide the capability to define parameters for the functions. These parameters will be stored in the meta data repository 600, and accessed by this layer.

Figure 7B:
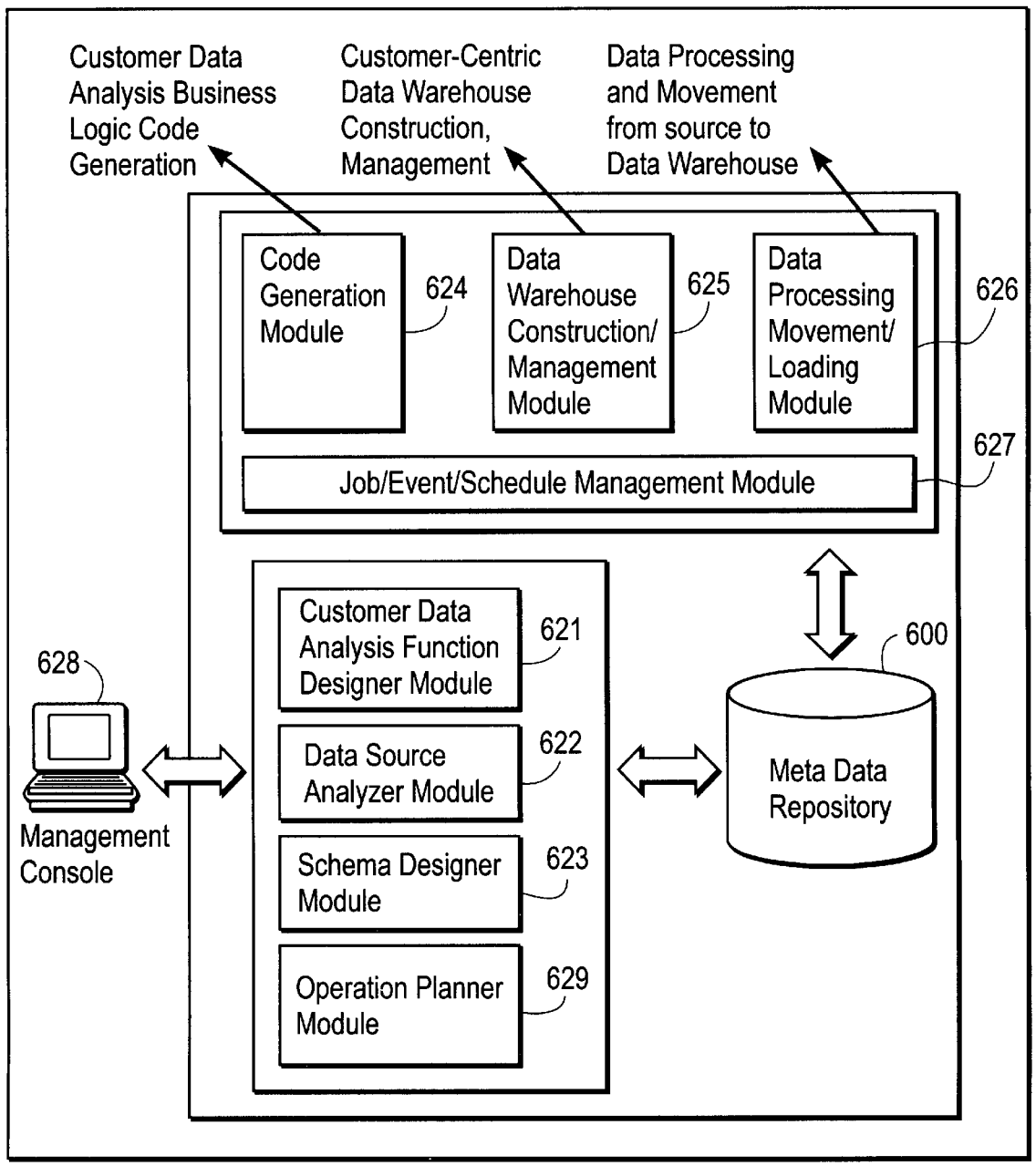

FIG. 7B illustrates representative customer centric data warehouse builder, such as the customer centric data warehouse builder 109 of FIG. 1, in a particular embodiment according to the present invention. This diagram is merely an illustration and should not limit the scope of the claims herein. One of ordinary skill in the art would recognize other variations, modifications, and alternatives. Customer centric data warehouse builder of FIG. 7B comprises a data schema designer module 623 operable to integrate business model requirements and data source analysis and generate target data schema for the customer-centric data warehouse. The process of data schema generation has been discussed in reference to FIG. 5B. Module 623 provides a graphical user interface enabling users to plan, edit, navigate and the like the data model defined in accordance with the process steps of FIG. 5B.

Meta data repository 600 stores meta data, including meta data about data schema, such as the reverse star schema generated by schema designer module 623, data movement mapping rules, various job schedules to load or maintain data flow to and within the data warehouse, user parameters for code generation of customer data analysis, and the like.

Code generation module 624 generates customer data analysis function code. Function code is generated based on stored meta data, such as the meta data stored in meta data repository 600. Meta data, such as the finalized data schema, and user parameters input to the customer data analysis function designer module 621 comprise the inputs of the code generation processes. In a particular embodiment according to the present invention, code generation can be based on a set of built-in function code templates.

Job/event/schedule management module 627 manages operations of the building, management, and maintenance of the customer-centric data warehousing environment. This can include management of jobs, events, exceptions, schedules and the like throughout the data warehouse environment. Planned tasks can be managed as jobs using schedules. Occurrences of activity can be represented as events, exceptions and the like, and can be managed by this module. Events and exceptions can trigger other jobs in some embodiments.

Data processing/movement/loading management module 626 provides pre-processing of data before data movement, physical data transport across networks, and data loading tasks on destination machines.

Data warehouse construction and management module 625 manages the construction of the data warehouse, including database object management tasks such as table creation, physical space management, indexing and the like. Further, module 625 manages data warehouse operations after the data warehouse has been constructed.

Customer data analysis function designer module 621 defines the configuration of customer data analysis functions 102, 104. Data analysis functions are designed to be customized, so customer data analysis function designer module 621 enables users to define different kinds of analysis functions. This module provides users with a graphical user interface to configure their own customer data analysis functions for their applications. The configuration information that user defined can be saved in the meta data repository as analysis function meta data, such as analysis function meta data 606 and the like.

Data source analyzer module 622 performs data source analysis. Data analyses can include source data model, data domain values, data volume analysis, and the like. This module can provide users with a graphical user interface for user analysis activities.

Management console 628 is a graphical user interface that integrates user's design and management activities. Management console 628 interfaces to a data schema designer 623, data source analyzer 622, operation planner 629, customer data analysis function designer 621 and the like.

Operation planner module 629 provides a graphical user interface to plan the operational aspects of the customer data analysis environment. Module 629 can store operational meta data, such as job definitions, event definitions, scheduling information and the like, in the meta data repository 600, for retrieval by Job/Event/Schedule Management Module 627 to perform tasks based on operational meta data.

Database applications comprise application code based on a data model used in a database. Typically, the application code is designed and developed after the data model is realized. Application code follows certain abstract data model patterns, called a meta model, enabling it to provide portability of the code to other applications. Applications designed for a particular meta model can be reused in other similar situations. Customization and making those customization-related details available as meta data to application code enables the application to work with a particular customer's unique requirements. Database designers make choices from among competing factors for designing a particular data model and accompanying meta model. Factors to be considered comprise: (1) Flexibility in customizing the data model to fit different business application needs; (2) Flexibility in designing re-usable application code; and (3) Level of usefulness of the application functionality by using the data model.

For example, a star schema data model combined with a multi-dimensional meta model comprises one possible data model-meta model combination. The star schema comprises the data model and the multi-dimensional model comprises the meta model. Data warehousing techniques can be embodied using many data model and meta model combinations. Meta models simplify analyzing and understanding performance or efficiency of operational aspects of operations in an enterprise. A multi-dimensional model provides a macroscopic description of the enterprises' performance. Typically, this macroscopic perspective can be highly summarized so that enterprise managers, such as company executives, governmental officials and the like, are afforded a clear "big picture" of the enterprise. Data can be indexed by multiple processes, aspects and the like within the enterprise in order to provide different view points to enterprise managers.

In many embodiments, the multi-dimensional model is mapped to a particular relational data model, called the schema, which can be a star schema, or others. A schema is a database organization corresponding to a data model. Records in dimension tables of a relational database can be mapped to a plurality of indices of the dimensions in multi-dimensional model, and the records in a database fact table can be mapped to the measures or data points in the multi-dimensional model. In many embodiments, the data model provides operational performance analysis used in a plurality of corporate-wide decision support applications. Various applications, tools, systems, frameworks, database managers and the like can be embodied as re-usable products based on the meta model, i.e., the multi-dimensional model, and the data model, i.e., the schema and its variations.

Conclusion

Although the above has generally described the present invention according to specific systems, the present invention has a much broader range of applicability. In particular, the present invention is not limited to a particular kind of data schema, but can be applied to any data model where an improved or optimized analysis is desired for use with customer centered data warehousing systems and applications. Thus, in some embodiments, the techniques of the present invention could provide access to many different legacy business, governmental and educational databases of all kinds. Of course, one of ordinary skill in the art would recognize other variations, modifications, and alternatives.

What is claimed is:

1. A computer based method for data warehousing, comprising:

selecting a template from a plurality of pre-defined ones, said templates embodying a plurality of characteristics of a business;

selecting at least one of a plurality of customer entities from a plurality of pre-defined ones to form of focal group of customer entities, said selecting based upon said template;

defining at least one of a plurality of customer transaction entities and at least one of a plurality of attributes of said customer transaction entities to form a customized group of customer activity components;

defining at least one of a plurality of customer event types in said customer activity components, wherein said customer event types comprise attributes of said customer transaction entities in said customer activity components;

selecting at least one of a plurality of data tables and at least one of a plurality of attributes of said data tables to form a data schema, wherein said data schema is a reverse star data schema;

determining at least one of a plurality of attributes based on data types of tables of said data source;

determining for said attributes at least one of a plurality of primary keys;

creating a data warehouse database from said data schema; and creating at least one of a plurality of data mapping rules, said mapping rules providing translation information for tables and attributes of said data sources to said data warehouse.

2. The method of claim 1 further comprising defining for said attributes at least one of a plurality of foreign keys.

3. The method of claim 1 further comprising:

defining application-specific entities for said customer activity components.

4. The method of claim 3 further comprising:

defining at least one of a plurality of attributes for said application-specific entities.

5. The method of claim 1 wherein said deriving said data types is performed automatically.

6. The method of claim 5 further comprising:

providing to users the capability to make changes to said data types if they choose not to use the automatically derived ones.

* * * * *